United States Patent [19]

Keller et al.

[11] Patent Number: 4,688,106

[45] Date of Patent: Aug. 18, 1987

[54] VIDEO PROCESSING SYSTEM USING MULTI-HEAD DISC STORE

[75] Inventors: Paul R. N. Keller, Newbury; Robin A. Gawley, Ball Hill; Ian M. Stewart, Newbury, all of England

[73] Assignee: Quantel Limited, Kenley, Great Britain

[21] Appl. No.: 700,189

[22] Filed: Feb. 11, 1985

[30] Foreign Application Priority Data

Mar. 29, 1984 [GB] United Kingdom ............... 8408113

[51] Int. Cl.$^4$ .............................................. G11B 27/02
[52] U.S. Cl. ................... 358/342; 360/14.1; 360/72.2; 360/64; 360/63
[58] Field of Search ............. 358/335, 342; 360/13, 360/14.1, 35.1, 71, 72.1, 98, 64, 78, 106, 22, 62, 63, 64, 69, 97

[56] References Cited

U.S. PATENT DOCUMENTS

| 3,882,541 | 5/1975 | Ghose et al. | 360/78 |
| 3,911,484 | 10/1975 | Mutou | 360/97 |
| 4,270,150 | 5/1981 | Diermann | 360/78 |
| 4,577,240 | 3/1986 | Hedberg et al. | 360/22 |

OTHER PUBLICATIONS

Croll, M. G., "A Digital Storage System for an Electronic Rostrum Colour Camera," BBC Research Department, UK, pp. 252–255.

Primary Examiner—Robert L. Richardson
Attorney, Agent, or Firm—Cooper, Dunham, Griffin & Moran

[57] ABSTRACT

A video processing system which allows sequences of video pictures to be transferred to disc stores in real time. These sequences can be read out of the disc store and processed before being returned to the disc store to be read out in real time. This effect is achieved by employing disc stores with five parallel heads so that five bits of information can be written in or read from respective tracks on the disc in parallel.

5 Claims, 3 Drawing Figures

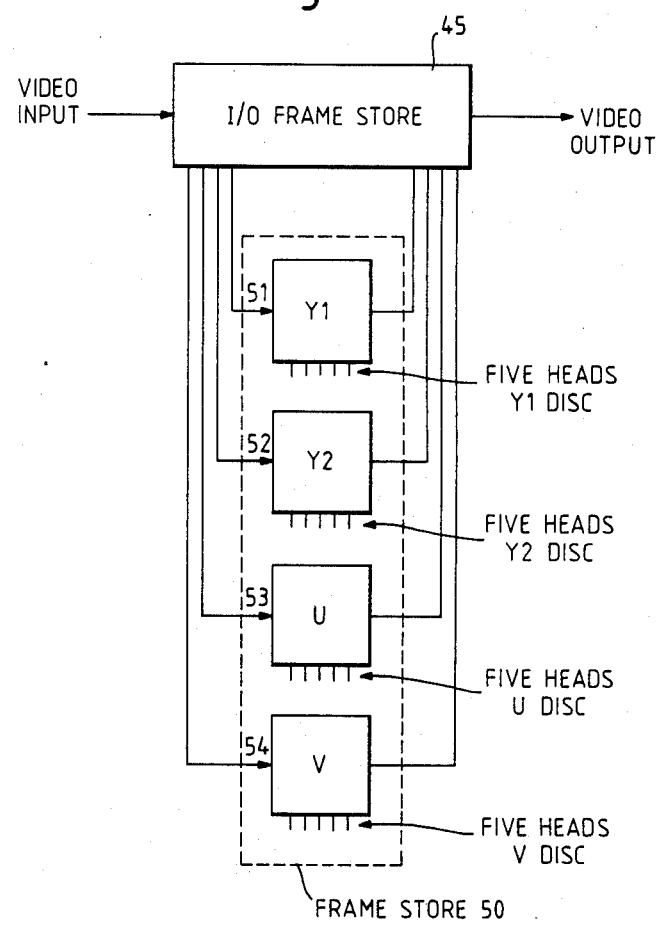

VIDEO PROCESSING SYSTEM USING MULTI-HEAD DISC STORE

BACKGROUND OF THE INVENTION

This invention relates to video signal processing or viewing systems, especially though not exclusively for editing or keying programs for television.

In television, there is a frequent requirement for processing or combining sequences of picture signals. This may, for example, involve putting together sequences of pictures from different sources, superimposing one picture on part of another, splitting images and so on. The processing is frequently carried out using video tape recorders and it requires great skill and dexterity as well as being time consuming and inaccurate.

OBJECT OF THE INVENTION

The object of the present invention is to provide an improved system for processing or viewing video signals to facilitate the processing.

SUMMARY OF THE INVENTION

According to the present invention, there is provided a video signal processing system comprising disc store means having the capacity for storing video signals for a relatively large number of pictures and having a plurality of transducing heads which can be operated in parallel, frame store means having the capacity for storing video signals for a relatively small number of pictures, a first transfer channel for transferring sequential video signals having a predetermined pixel frequency from an external circuit to said frame store means, and vice versa, signal converting means for reading signals from said frame store means and reforming them for application to said transducing heads operating in parallel, and vice versa, the number of said heads operating in parallel and the arrangement of said signal converting means being such that video signals can be transferred at such a rate as to enable the transfer of a picture to or from the disc store means in a time not exceeding that required to transfer a picture in said first channel. Preferably, also, means are provided for combining video signals from different pictures read from said frame store means, to process said video signal.

Further according to the invention there is provided a video signal processing system comprising disc store means having the capacity for storing video signals for a relatively large number of pictures and having a plurality of transducing heads which can be operated in parallel, frame store means having the capacity for storing video signals for a relatively small number of pictures, a first transfer channel for transferring sequential video signals having a predetermined pixel frequency from an external circuit to said frame store means, and vice versa, a plurality of second transfer channels for transferring video signals in parallel from different sections of said frame storage means to respective ones of said transducing heads, and vice versa, the number of said second transfer channels being sufficient to enable the transfer of a field or frame of video signals in a field or frame period of said sequential video signals.

The system according to the invention may be arranged, for example, to allow sequences of television signals from an external circuit, such as one or more studio cameras, to be transferred in "real" time to the disc store means, for processing. In such a case, a frame of the video signals in a sequence as produced by the external circuit is read into the frame storage means, and is then transferred during a subsequent frame period to the disc store means, by the slow parallel transfer channels, leaving space in the frame store means for another frame of video signals from the external means. The frame transferred need not be of the television kind with interleaved fields but can be video signals representing a picture. For continuous transfer, two frame stores of the frame store means are used in alternating manner. When the transfer of two or more sequences to the disc storage means is complete, selected frames from the disc store can be transferred to the frame store means via the parallel transfer channels, so that they can be processed to produce frames which can then be returned to the disc store means to be read out subsequently in real time as required.

BRIEF DESCRIPTION OF DRAWINGS

In order that the invention be clearly understood and readily carried into effect, one example thereof will now be described with reference to the accompanying drawings in which FIGS. 1 and 2 illustrate the respective disc store means and frame store means and FIG. 3 illustrates a second embodiment of the invention.

DETAILED DESCRIPTION OF INVENTION

Figure 1:
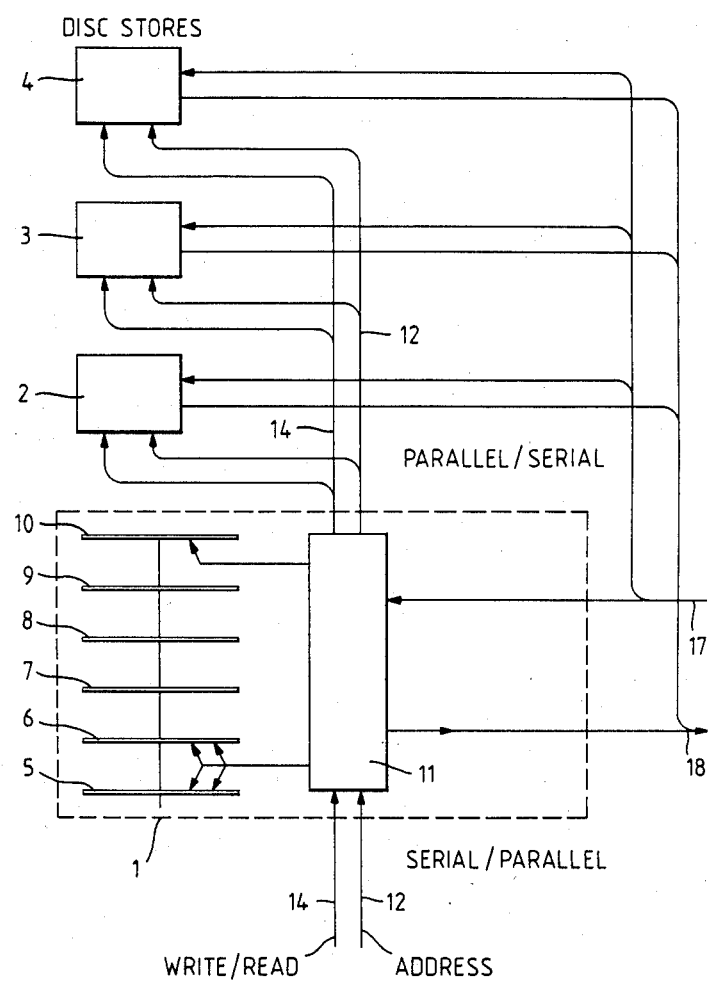

Referring to the drawings, the disc store means illustrated in FIG. 1 comprises four magnetic disc storage devices 1 to 4, each of which is an OEM Parallel Data Transfer Disc Drive M2350A manufactured by Fujitsu Limited. Each device has six magnetic storage discs, and twenty magnetic transducing heads co-operating with respective discs. In the case of device 1, the six discs are represented by references 5 to 10, and five of the heads are represented by arrows. Each device further comprises actuator, control and drive circuits, represented generally in the device 1, by the block 11. Each device is capable of operating in different modes and one of these modes is the so called five channel mode in which five channels, are connected at any one time to a group of five heads, so that five bits can be written on or read from respective tracks on the discs in parallel. For the purpose of the invention, the devices 1 to 4 are all conditioned to operate in this mode. The particular group of five heads connected to the five channels depends on the address in the device selected at any time, and the address circuit for the disc store means is represented diagrammatically in FIG. 1 by reference 12. The circuit is connected to the control processor 13 shown in FIG. 2. A circuit for transmitting write or read command signals is represented by 14 in FIG. 1, and this is also connected to the processor 13. The various disc store devices 1 to 4 are operated in parallel, so that they can be controlled by the same address and command circuits.

The devices 1 to 4 are, as is known, arranged for storing digital signals in bit-serial mode. The frame store means of the system illustrated is, however arranged to operate with digital signals in bit-parallel mode. The disc store means has a twenty channel input highway 17 for transferring signals from the frame store means of FIG. 2 to the disc store means, and a twenty channel output highway 18 for transferring signals in the reverse direction. In this example, it will be assumed that the signals to be transferred are eight bit digital words, transmitted in bit serial mode. The twenty channels of the input highway 17 branch into four groups of five channels each, and each group is connected to one of the disc store devices 1 to 4. Each channel is fed to one of the groups of five heads of the device. The disc store means is therfore capable of writing simultaneously via different heads, twenty digital signals received in parallel on the input highway 17, under control of the appropriate command signal in the ciruit 14. The addresses at which signals are written are determined by signals in the ciruit 12. In a similar way when the devices are switched for reading the serial to parallel mode converter 16 in each device connects the five head channels to the output highway 18 which is capable of transferring the twenty digital signals from the respective heads to the frame store means in parallel. The disc store devices 1 to 4 are known articles of commerce and further description of the manner of their connection and operation is deemed unnecessary.

Figure 2:
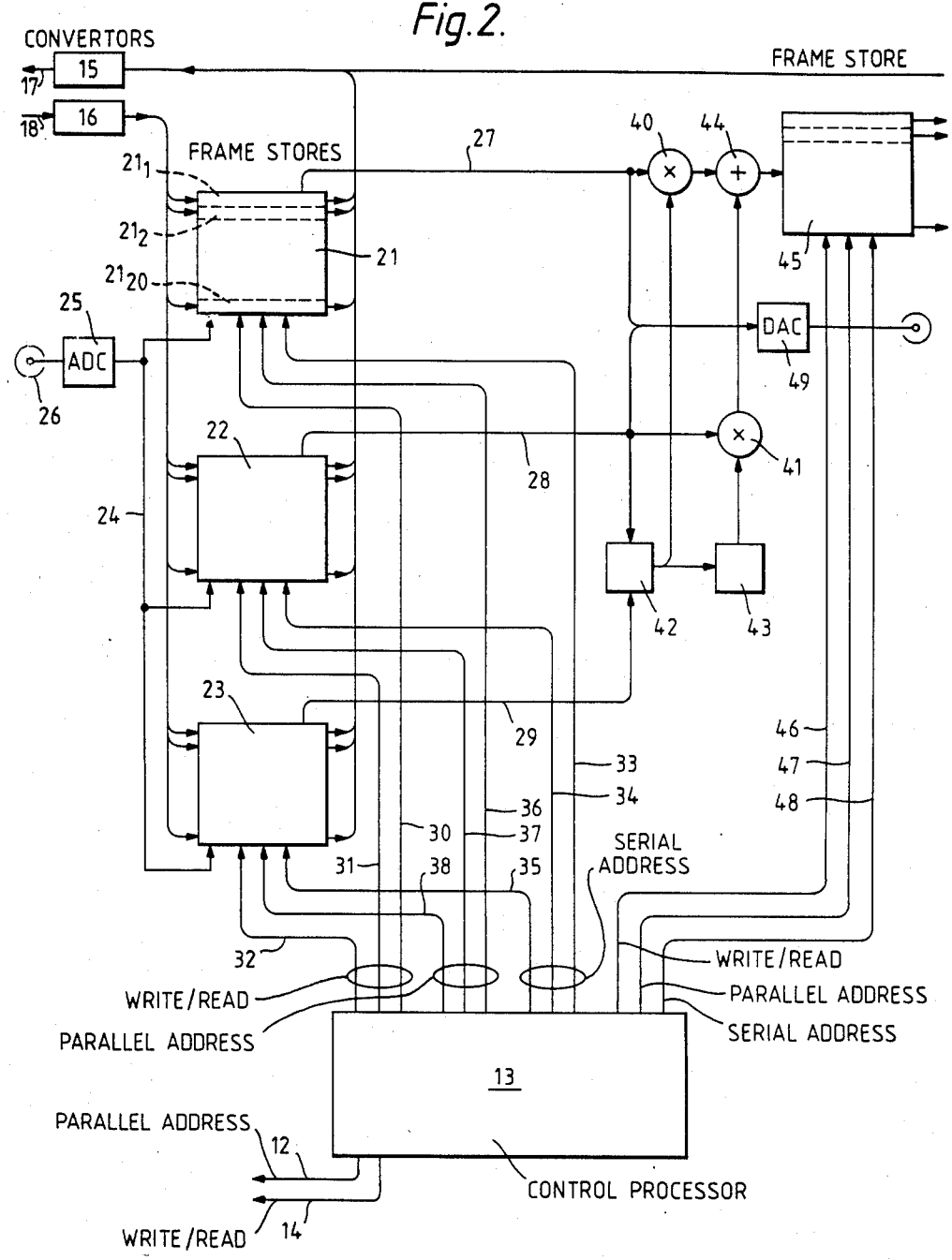

The frame store means shown in FIG. 2 comprises three frame stores 21, 22 and 23 each capable of storing a frame of color television video signals in digital form. Such stores are also articles of commerce, and need not be described in detail. The stores 21, 22 and 23 have a common input channel 24 for receiving sequential video signals from an external circuit. The input channel is shown as leading from an analogue-to-digital converter 25 which has an input terminal 26 for connection to the external circuit. The external circuit may for example include a television camera or video tape recorder as a source of the sequential video signals, which would be in analogue form. The frame stores 21, 22 and 23 have respective output channels 27, 28 and 29 for sequential video signals read from the stores. There are circuit connections 30, 31, 32 to the frame stores from the control processor 13 for applying write or read command signals to the stores, and there are also circuit connections 33, 34 and 35 to the frame stores from the control processor 13 for addressing the storage locations in the stores in sequence so that sequential video signals can be written into or read from the stores systematically. The stores are multi-planar stores so that the video signals are stored in bit parallel mode, the input and output channels being eight bits wide.

In addition to the above mentioned circuits for sequential video signals, the frame stores 21, 22 and 23 have further address circuits 36, 37 and 38 connected to the control processor 13. These circuits are arranged to divide the respective stores into twenty sections (represented for example by reference $21_1$, $21_2$, $21_{20}$ in the case of store 21) each containing 1/20 of the storage locations of the store. The division is effected by so arranging the address circuits 36, 37 and 38 that each addresses corresponding locations in the sections of the store in parallel. The twenty channels of the input highway 17 of the disc store means are, moreover, connected respectively to the twenty sections of each of the frame stores 21, 22 and 23. The connection is effected in each case via a parallel to serial converter 15 which converts the bit parallel mode signals on the highway 17 into bit serial mode signals compatible with the disc store circuits. Therefore when a read command signal is applied to one of these stores (via circuit 30, 31 or 32) and the respective address circuit 36, 37 or 38 is activated to select successive addresses, signals in the twenty sections of the store selected by the read command are read in parallel and transferred via the highway 17 to be written in parallel by twenty of the transducing heads into the discs of the disc store means. A write command signal is applied for this purpose to the circuit 14 of the disc store means, and the address at which the signals are written in the discs is controlled by the address circuit 12.

The twenty channels of the output highway 18 of the disc store means are similarly connected, in this case via a serial-to-parallel converter 16, to the twenty sections of each frame store 21, 22 or 23 as shown in FIG. 2 so that when a read command signal is applied to disc store means, twenty words at a time are transferred in parallel from the disc store means to the twenty sections of the frame store, the words being read from the locations of the disc store means and written in the locations of the frame store means determined by the address circuit 12 and the selected one of the parallel address circuits 36, 37 and 38.

The sequential-signal output channels 27 and 28 of the frame stores 21 and 22 are connected to one input of respective digital multiplying circuits 40 and 41. The sequential-signal output channel 28 of the frame store 22 and the corresponding channel 29 of the frame store 23 are connected to a selector circuit 42 which can be controlled by the operator, or by the processor 13, to select the signal on one of the two output channels 28 and 29. The selected signal is applied as the multiplier to the multiplying circuit 40 and it is also applied to a complementing circuit 43, the output of which is applied as the multiplier to the second multiplying circuit 41. The output of the two multiplying circuits 40 and 41 are added in an adding circuit 44 and the output signal, which will be a sequential signal, is applied to a further frame store 45 which is sectionalized like the frame stores 21, 22 and 23. It has also, like these stores, a write/read command circuit 46, a parallel address circuit 47 and a serial address circuit 48. The output signal channels of the store 45 are connected to the twenty channels of the input highway 17 of the disc store. A sequential output can be taken directly from the channels 27 and 28 via a digital-to-analogue converter 49.

One example of the use of the invention is when the system is used for keying. As will appear, video signals representing frames selected from different sequences of television signals are stored in the frame stores 21 and 22, whilst a key signal may be stored in the frame store 23. A key signal is a fractional signal in the range from 0 to 1 related to a particular video signal, say that in store 21. It has a value 0 when the respective video signal is not intended to contribute to the output signal, value 1 when the respective video signal is intended to make the sole contribution to the output signal, and varies smoothly between these values on transition between these two conditions. The key signals related to different frames of input signals may be generated in an external circuit in known manner, and can be applied to the input terminal 26 and written in the disc store means at predetermined addresses as if they were video signals. When keying is carried out, the key signals are read into the store 23 in association with related video signals in store 22. Referring to FIG. 2, assume there are video signals V1 and V2 relating to different pictures in the two stores 21 and 22 and a key signal K in the store 23. Assume also that the selector 42 is switched to select the signal K for application the multiplier 40 and the complementing circuit 43. A read command is applied to the three stores 21, 22 and 23 and the serial address circuits are operated to read the signals in the stores sequentially. Each video signal read from the store 21 will be multiplied by K in circuit 40, and each video signal read from the store 22 will be multiplied by (1−K) in the circuit 41. The output of the adding circuit 44 will therefore be:

$$KV_1+(1-K)V_2$$

If K is 1, this signal equals $V_1$, if K is 0 it equals $V_2$, and if $0<K<1$ the output will be composed of complementary proportions of $V_1$ and $V_2$.

If the selector 42 is switched to select as its output the video signal $V_2$ from the store 22, then it will be appreciated from the foregoing that this video signal will act as a self-keying signal. In such a situation, the selector 42 may be arranged to deliver a signal of value 1 if the signal on 28 has one characteristic and a signal of value 0, if the signal on 28 has a different characteristic.

The frame stores 21, 22 and 23 together with their serial address circuits are such that sequential video signals can be written into and read from the stores at a relatively fast rate, of the order of 13.5 megawords (each of 8 bits) per second, for each of luminance and chrominance signals, corresponding to the sampling rate needed for the sequential television signals of 6.75 MHz luminance band width. Such reading and writing rates can be achieved with existing frame stores available in commerce. This enables color television video waveform, to be digitized and written into and read from the frame stores in real time. In the disc store device 1 to 4 on the other hand, each head channel has a slow transfer rate of only 1.859 megawords (in bit serial mode) per second and the individual parallel address circuits such as 36, 37 and 38 have to be operated at this rate. However, the fact that four groups of five channels are provided, enables the disc store means to read or write a total of over 27 megawords per second, even taking account of the fact that the overall rate of transfer is reduced to about 4/5 of what it would otherwise be due to the time taken for the disc stores to position the heads to select the required video frame from any part of the disc. Therefore, not only can a full frame of both luminance and chrominance or key signals from the external circuit 26 be transferred into one or other of the frame stores 21, 22 and 23 in real time, it can also be transferred to the disc store means effectively in real time during a subsequent frame period.

Although the disc store means is arranged to read or write at a rate of 27 megawords per second, on average reading or writing is irregular since it may be interrupted or delayed from time to time whilst a required video frame address is being selected. As a consequence, when reading video signals into the disc storage means via the frame stores, situations may occur, for example, then the frame store 21 becomes full, before the frame store 22 has been emptied of the previous frame. For this reason, it is arranged to use the frame store 23 for receiving the next incoming frame of video signals, whilst reading is completed from frame store 22 and then takes place from frame store 21. The number of frame stores such as 21, 22 and 23 may in fact be increased and they may be switchable so that one of them can be selected, at any time, to perform the function of the frame store 45.

One example of the operation of the system for keying will now be considered. A first sequence of video signal $V_1$ is applied to the input circuit 26. During a first frame period, a write command signal is applied from the processor 13 via circuit 30 to the frame store 21 and the store locations are sequentially addressed via circuit 33 to read one frame of the applied video signals sequentially into the store. During the next frame period, the process is repeated in respect of the store 22, to read the next frame of video signals sequentially into the store 22. During this same frame period, frame store 21 receives a read-command signal from circuit 30, a write command signal is applied to circuit 14, and the parallel address circuits 12 and 36 are activated to read the complete contents of the store into the disc store means, where it is held at the addresses identified by the address circuit 12. The transfer takes place via the twenty channel highway 17, twenty words being transferred in parallel at each head location. During the third frame period, the next incoming frame is read into store 23, and the contents of store 22 are transferred to the disc store means. This process is continued, alternating the functions of the stores 21 and 22, until all the required sequence of picture frames have been transferred to the disc store means.

Next, a second sequence of video signals $V_2$ representing a picture sequence to be used in keying the first sequence is transferred effectively in real time, and via the frame stores 21 and 22, into the disc store means. Subsequently, a sequence of key signals K is similarly transferred into the disc store. Keying on a frame by frame basis may now take place.

To carry out keying, a desired frame of the sequence $V_1$ selected by the address circuit 12 is transferred via the highway 18 to the frame store 21 say during a first frame period. During the next frame period, a desired frame of the sequence $V_2$, selected by the address circuit 12, is transferred to the frame store 22. During a third frame period a desired frame of key signals K is transferred to the frame store 23 and these operations are carried out under control of the parallel address circuits 12, 36, 37 and 38. In the fourth frame period, the system is changed to serial operation and the signals in all three stores 21, 22 and 23 are read out sequentially and appear in the circuits 27, 28 and 29. Circuit 42 is operated to select the key signal K and the signal $V_1$ and $V_2$ in the circuits 27 and 28 are combined under control of the key signal K as described above, to produce an keyed frame of video signals. The keyed signals appear at the output of the adding circuit 44 and are read into the frame store 45, which receives a write command via circuit 46 and appropriate address commands via circuit 48. Finally, in the next a fifth frame period, the signals in the frame store 45 are transferred, via the twenty channel highway 17 to the disc store, the transfer being affected by parallel addressing.

Other keyed frames can be produced by repeating the above sequence of operations as many times as desired. The process is relatively rapid since one edited frame is produced in five frame periods. It will, of course, be appreciated that many sequences of video signals, representing different sequences of television pictures, can be stored in the disc store means and other editing procedures may be adopted. For example, as indicated, one video signal may be used to act as a self-key instead of having a seperate key signal K. The key signal may also be derived in many different ways.

When a sequence of edited frames has been built up in the disc store means, it can be read effectively in real time by transferring the frames of video signals alternately, via the highway 18, to the frame stores 21 and 22 during successive frame periods, and transferring the frames from the frame stores alternately (one frame period later) to the external circuit via the digital-to-analogue converter 49. The transfer to the external circuit is carried out, of course, as a sequential signal transfer in real time.

The system according to the invention can also be useful for viewing the effect of a number of single frame pictures put together to form a sequence. The individual frames of video signals can be derived for example from a videographic system or a rostrum camera, and they are read one at a time into the disc storage means, via the frame storage means. As the build up in the disc storage means progresses the frames can be read in real time and viewed as a moving picture, so that the effect, which may be that of an animated cartoon or a moving caption, can be monitored.

FIG. 3 shows a second embodiment of the invention in which the frame stores are arranged in a different manner. In this embodiment the incoming video is split into four eight bit components, i.e. two luminance and two chrominance at 13.5/2 MHz and each component is stored on a separate disc device. The frame store 50 (which corresponds to 21 in FIG. 2) is split into four sections 51 to 54 to connect with the four disc devices. The twenty channels of the input highways 17 now connect five channels from each of the four sections of the frame store to the five heads of the disc devices. When information is being transferred in from the disc store to the frame store one byte of information is taken in bit serial mode by each of the five heads on the disc and these five bytes are then written in a block into one of the sections of the frame store. It will be obvious how the information is transferred from the frame store to the disc store. In this mode of operation the format conversion which is required to allow transfer to occur between frame store and disc store means is carried out by virtue of the mode of operation of the frame stores and the separate serial-parallel and parallel to serial converters of FIG. 2 will no longer be required but the other apparatus will be substantially similar. A number of the frame stores split into four sections will be used in the apparatus.

In the foregoing description, reference is made to video signals each of eight bits; assumed to be luminance and chrominance signals. The signals may be in the form of luminance samples at 13.5 million per second and alternate U and V chrominance samples each of 13.5/2 million per second the frame stores being organized in a suitable way to store the different samples.

What is claimed is:
1. A video signal processing system comprising:
disc store means having a plurality of storage discs having the combined capacity for storing video signals for a relatively large number of pictures and having a plurality of groups of transducing heads to selectively read and write video signals in predetermined picture storage positions on the storage discs and circuit means for rendering the heads of a selected group operable in parallel for video signals in bit serial mode;
frame store means comprising a plurality of framestores having the capacity for storing video signals in bit parallel mode for a relatively small number of pictures;
a first transfer channel for transferring sequential video signals having a predetermined pixel frequency from an external circuit to said frame store means, and vice versa;
said framestores being each arranged for parallel reading and writing in a plurality of address locations thereof equal in number to the number of heads in a group; a highway having a plurality of channels and circuit means for connecting the heads in a selected group via said channels to the respective addresses of a selected framestore in parallel and for reading video signals from said framestore and applying them to respective heads and vice versa, wherein the signals for said highway are converted from bit parallel to bit serial mode or vice versa as required, and video signals can be transferred at such a rate as to enable the transfer of a picture to or from the disc store means in a time not exceeding that required to transfer a picture in said first channel.

2. A video signal processing system as claimed in claim 1, wherein the number of said heads and said highway are selected to cause a picture to be transferred to and from said disc store means in a time including interruption or delays for address selection in said disc storage means, which on average does not exceed the time required for the transfer of pictures via said first channel.

3. A video signal processing system as claimed in claim 1, including means for transferring one or more pictures from said disc store means to said frame store means for editing of the pictures.

4. A video signal processing system as claimed in claim 3, including means for keying of pictures transferred from said disc store means to said frame store means.

5. A video signal processing system comprising:
disc store means having the capacity for storing video signals for a relatively large number of pictures and having a plurality of transducing heads which can be operated in parallel;
frame store means having the capacity for storing video signals for a relatively small number of pictures;
a first transfer channel for transferring sequential video signals having a predetermined pixel frequency from an external circuit to said frame store means, and vice versa;
a plurality of second transfer channels for transferring video signals in parallel from different sections of said frame store means to respective ones of said transducing heads, and vice versa;
the number of said second transfer channels being sufficient to enable the transfer of a field or frame of video signals in a field or frame period of said sequential video signals transferred between the frame store means and the external circuit.

* * * * *